United States Patent
Dean et al.

(10) Patent No.: US 9,928,659 B2
(45) Date of Patent: Mar. 27, 2018

(54) METHOD AND SYSTEM FOR GENERATING AUGMENTED REALITY AGRICULTURAL PRESENTATIONS

(71) Applicant: PRECISIONHAWK INC., Thornhill (CA)

(72) Inventors: William Christopher Dean, Raleigh, NC (US); Ernest Earon, Thornhill (CA); Seyed Ali Shahdi, Whitby (CA); Patrick Neal Lohman, Noblesville, IN (US); Andrew Thomas Slater, Raleigh, NC (US); Greer Monterastelli, Buffalo, WY (US)

(73) Assignee: Precisionhawk Inc. (CA)

( * ) Notice: Subject to any disclaimer, the term of this patent is extended or adjusted under 35 U.S.C. 154(b) by 0 days.

(21) Appl. No.: 15/101,081

(22) PCT Filed: Jan. 5, 2015

(86) PCT No.: PCT/CA2015/000001
§ 371 (c)(1),
(2) Date: Jun. 2, 2016

(87) PCT Pub. No.: WO2015/103689
PCT Pub. Date: Jul. 16, 2015

(65) Prior Publication Data
US 2016/0307373 A1    Oct. 20, 2016

Related U.S. Application Data

(60) Provisional application No. 61/925,045, filed on Jan. 8, 2014.

(51) Int. Cl.
*G06T 19/00* (2011.01)
*G01C 11/02* (2006.01)
*G06T 11/00* (2006.01)

(52) U.S. Cl.
CPC .......... *G06T 19/006* (2013.01); *G01C 11/025* (2013.01); *G06T 11/00* (2013.01)

(58) Field of Classification Search
CPC . G06F 17/3087; G06F 17/30256; G06K 9/78; B64C 2201/123; B64C 2201/127
See application file for complete search history.

(56) References Cited

U.S. PATENT DOCUMENTS

| 5,878,356 A | 3/1999 | Garrot, Jr. et al. |
| 7,298,869 B1 * | 11/2007 | Abernathy ........... G06K 9/0063 324/323 |

(Continued)

FOREIGN PATENT DOCUMENTS

| CA | 2756912 A1 | 6/2012 |
| EP | 2612110 A1 | 7/2013 |

(Continued)

OTHER PUBLICATIONS

International Search Report and Written Opinion for corresponding international application No. PCT/CA2015/000001, dated Mar. 20, 2015.

(Continued)

*Primary Examiner* — Thomas Lett
(74) *Attorney, Agent, or Firm* — Withrow & Terranova, PLLC

(57) ABSTRACT

A method for generating an augmented reality presentation of a region-of-interest, comprising: capturing raw image data of the region-of-interest using a first sensor mounted in an unmanned aerial vehicle flown over the region-of-interest; transferring the raw image data to a server from the unmanned aerial vehicle; using a processor, generating geo-referenced data from the raw image data at the server; transferring the geo-referenced data to a wireless device; capturing live image data of the region-of-interest using a second sensor mounted in the wireless device; and, over- (Continued)

laying the geo-referenced data on the live image data to generate the augmented reality presentation at the wireless device.

18 Claims, 3 Drawing Sheets

(56) References Cited

U.S. PATENT DOCUMENTS

| | | |
|---|---|---|
| 2003/0130767 A1 | 7/2003 | Carroll |
| 2008/0147325 A1* | 6/2008 | Maassel .................. G06T 17/05 |
| | | 702/5 |
| 2010/0313146 A1 | 12/2010 | Nielsen et al. |
| 2012/0257047 A1 | 10/2012 | Biesemans et al. |
| 2014/0312165 A1 | 10/2014 | Mkrtchyan |
| 2015/0254738 A1* | 9/2015 | Wright, III ......... G06Q 30/0284 |
| | | 705/26.81 |

FOREIGN PATENT DOCUMENTS

| | | |
|---|---|---|
| WO | 2011/008611 A1 | 1/2011 |
| WO | 2012/028386 A1 | 3/2012 |

OTHER PUBLICATIONS

International Preliminary Report on Patentability for International Patent Application No. PCT/CA2015/000001, dated Jul. 21, 2016, 6 pages.

\* cited by examiner

METHOD AND SYSTEM FOR GENERATING AUGMENTED REALITY AGRICULTURAL PRESENTATIONS

This application claims priority from and the benefit of the filing date of U.S. Provisional Patent Application No. 61/925,045, filed Jan. 8, 2014, and the entire content of such application is incorporated herein by reference.

FIELD OF THE INVENTION

This invention relates to the field of computer graphics, and more specifically, to a method and system for generating augmented reality agricultural presentations.

BACKGROUND OF THE INVENTION

Augmented reality ("AR") refers to the live or real-time view of a physical or real-world environment whose elements are augmented (or supplemented) by computer-generated sensory input such as sound, video, graphics or geographical positioning system ("GPS") data. As such, AR enhances a user's perception of reality. In contrast, virtual reality refers to the replacement of the real world with a simulated one. In an AR system, augmentation is generally performed in real-time and in semantic context with environmental elements, such as sports scores presented on television during a game. In some AR systems equipped with computer vision, object recognition, etc., real-world information concerning the user's surrounding environment may be made interactive and digitally manipulable. In addition, artificial information concerning the environment and its objects may be overlaid on the real-world information.

Augmented reality farming or agriculture refers to the application of AR techniques to farming and agriculture. AR techniques may be used to overlay sensor data, previous crop imagery, or other information over a farmer's or user's visual reality with a view to improving farm production, crop rotation, pest management, land development, etc. For example, AR techniques may be used to generate a three-dimensional information model over a topographic map of a farm field to illustrate multiple data sets such as altitude (represented by the height of the model), expected crop yield (represented by a first color in first view), and actual crop yield (represented by a second color in a second view). As another example, AR historical rainfall patterns may be viewed by a user to help support sensible planting or land development and to help manage run-off and other potentially detrimental events. As a further example, AR nutrient content (from sensors or static test equipment) over a field may be viewed by a user to help decide upon the best companion planting, best crops to plant, etc., for the field.

One problem with existing AR farming techniques relates to the effective collection and transfer of data from the field or region-of-interest for overlaying on the real-time view of the field or region-of-interest to generate the AR presentation.

A need therefore exists for an improved method and system for generating augmented agriculture presentations. Accordingly, a solution that addresses, at least in part, the above and other shortcomings is desired.

SUMMARY OF THE INVENTION

According to one aspect of the invention, there is provided a method for generating an augmented reality presentation of a region-of-interest, comprising: capturing raw image data of the region-of-interest using a first sensor mounted in an unmanned aerial vehicle flown over the region-of-interest; transferring the raw image data to a server from the unmanned aerial vehicle; using a processor, generating geo-referenced data from the raw image data at the server; transferring the geo-referenced data to a wireless device; capturing live image data of the region-of-interest using a second sensor mounted in the wireless device; and, overlaying the geo-referenced data on the live image data to generate the augmented reality presentation at the wireless device.

In accordance with further aspects of the invention, there is provided an apparatus such as a data processing system, a method for adapting same, as well as articles of manufacture such as a computer readable medium or product and computer program product or software product (e.g., comprising a non-transitory medium) having program instructions recorded thereon for practising the method of the invention.

BRIEF DESCRIPTION OF THE DRAWINGS

Further features and advantages of the embodiments of the present invention will become apparent from the following detailed description, taken in combination with the appended drawings, in which.

It will be noted that throughout the appended drawings, like features are identified by like reference numerals.

DETAILED DESCRIPTION OF THE EXEMPLARY EMBODIMENTS

In the following description, details are set forth to provide an understanding of the invention. In some instances, certain software, circuits, structures and methods have not been described or shown in detail in order not to obscure the invention. The term "data processing system" is used herein to refer to any machine for processing data, including the computer systems, wireless devices, and network arrangements described herein. The present invention may be implemented in any computer programming language provided that the operating system of the data processing system provides the facilities that may support the requirements of the present invention. Any limitations presented would be a result of a particular type of operating system or computer programming language and would not be a limitation of the present invention. The present invention may also be implemented in hardware or in a combination of hardware and software.

The present invention provides an AR agriculture or augmented agriculture related method and system for displaying relevant data overlaid on a real-time display of a region of interest (e.g., a farm field).

Figure 1:
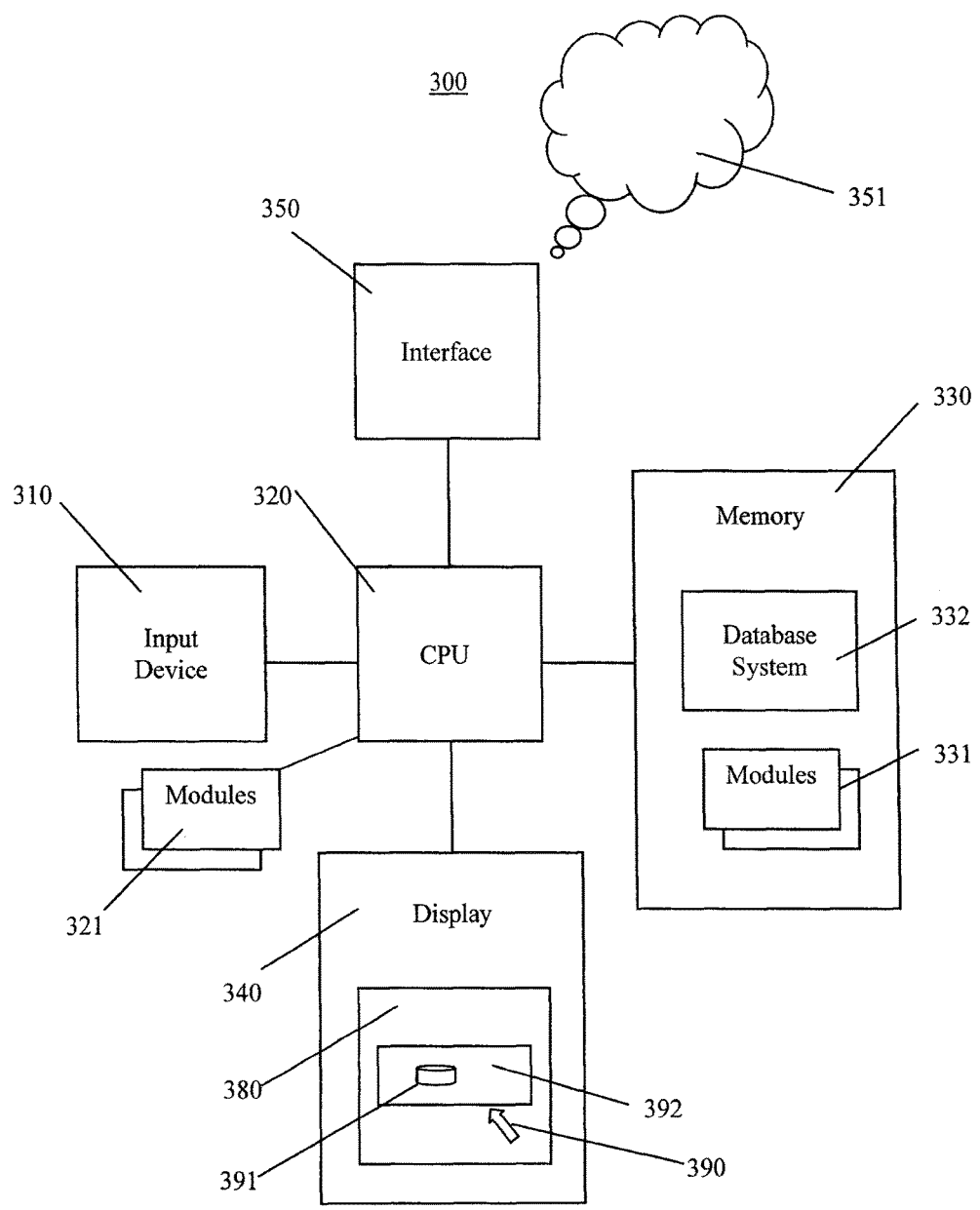
FIG. 1 is a block diagram illustrating a data processing system in accordance with an embodiment of the invention.

FIG. 1 is a block diagram illustrating a data processing system 300 in accordance with an embodiment of the invention. The data processing system 300 is suitable for data processing, management, storage, and for generating, displaying, and adjusting augmented reality ("AR") presentations in conjunction with a user interface or a graphical user interface ("GUI"), as described below. The data processing system 300 may be a client and/or server in a client/server system (e.g., 110, 120, 130). For example, the data processing system 300 may be a server system or a personal computer ("PC") system. The data processing system 300 may also be a wireless device or other mobile, portable, or handheld device. The data processing system 300 may also be a distributed system which is deployed across multiple processors. The data processing system 300 may also be a virtual machine. The data processing system 300 includes an input device 310, at least one central processing unit ("CPU") 320, memory 330, a display 340, and an interface device 350. The input device 310 may include a keyboard, a mouse, a trackball, a touch sensitive surface or screen, a position tracking device, an eye tracking device, or a similar device. The display 340 may include a computer screen, television screen, display screen, terminal device, a touch sensitive display surface or screen, or a hardcopy producing output device such as a printer or plotter. The memory 330 may include a variety of storage devices including internal memory and external mass storage typically arranged in a hierarchy of storage as understood by those skilled in the art. For example, the memory 330 may include databases, random access memory ("RAM"), read-only memory ("ROM"), flash memory, and/or disk devices. The interface device 350 may include one or more network connections. The data processing system 300 may be adapted for communicating with other data processing systems (e.g., similar to data processing system 300) over a network 351 via the interface device 350. For example, the interface device 350 may include an interface to a network 351 such as the Internet and/or another wired or wireless network (e.g., a wireless local area network ("WLAN"), a cellular telephone network, etc.). As such, the interface 350 may include suitable transmitters, receivers, antennae, etc. In addition, the data processing system 300 may include a Global Positioning System ("GPS") receiver. Thus, the data processing system 300 may be linked to other data processing systems by the network 351. The CPU 320 may include or be operatively coupled to dedicated coprocessors, memory devices, or other hardware modules 321. The CPU 320 is operatively coupled to the memory 330 which stores an operating system (e.g., 331) for general management of the system 300. The CPU 320 is operatively coupled to the input device 310 for receiving user commands or queries and for displaying the results of these commands or queries to the user on the display 340. Commands and queries may also be received via the interface device 350 and results may be transmitted via the interface device 350. The data processing system 300 may include a data store or database system 332 for storing data and programming information. The database system 332 may include a database management system (e.g., 332) and a database (e.g., 332) and may be stored in the memory 330 of the data processing system 300. In general, the data processing system 300 has stored therein data representing sequences of instructions which when executed cause the method described herein to be performed. Of course, the data processing system 300 may contain additional software and hardware a description of which is not necessary for understanding the invention.

Thus, the data processing system 300 includes computer executable programmed instructions for directing the system 300 to implement the embodiments of the present invention. The programmed instructions may be embodied in one or more hardware modules 321 or software modules 331 resident in the memory 330 of the data processing system 300 or elsewhere (e.g., 320). Alternatively, the programmed instructions may be embodied on a computer readable medium or product (e.g., one or more digital video disks ("DVDs"), compact disks ("CDs"), memory sticks, etc.) which may be used for transporting the programmed instructions to the memory 330 of the data processing system 300. Alternatively, the programmed instructions may be embedded in a computer-readable signal or signal-bearing medium or product that is uploaded to a network 351 by a vendor or supplier of the programmed instructions, and this signal or signal-bearing medium or product may be downloaded through an interface (e.g., 350) to the data processing system 300 from the network 351 by end users or potential buyers.

A user may interact with the data processing system 300 and its hardware and software modules 321, 331 using a user interface such as a graphical user interface ("GUI") 380 (and related modules 321, 331). The GUI 380 may be used for monitoring, managing, and accessing the data processing system 300. GUIs are supported by common operating systems and provide a display format which enables a user to choose commands, execute application programs, manage computer files, and perform other functions by selecting pictorial representations known as icons, or items from a menu through use of an input device 310 such as a mouse. In general, a GUI is used to convey information to and receive commands from users and generally includes a variety of GUI objects or controls, including icons, toolbars, drop-down menus, text, dialog boxes, buttons, and the like. A user typically interacts with a GUI 380 presented on a display 340 by using an input device (e.g., a mouse) 310 to position a pointer or cursor 390 over an object (e.g., an icon) 391 and by selecting or "clicking" on the object 391. Typically, a GUI based system presents application, system status, and other information to the user in one or more "windows" appearing on the display 340. A window 392 is a more or less rectangular area within the display 340 in which a user may view an application or a document. Such a window 392 may be open, closed, displayed full screen, reduced to an icon, increased or reduced in size, or moved to different areas of the display 340. Multiple windows may be displayed simultaneously, such as: windows included within other windows, windows overlapping other windows, or windows tiled within the display area.

Figure 2:
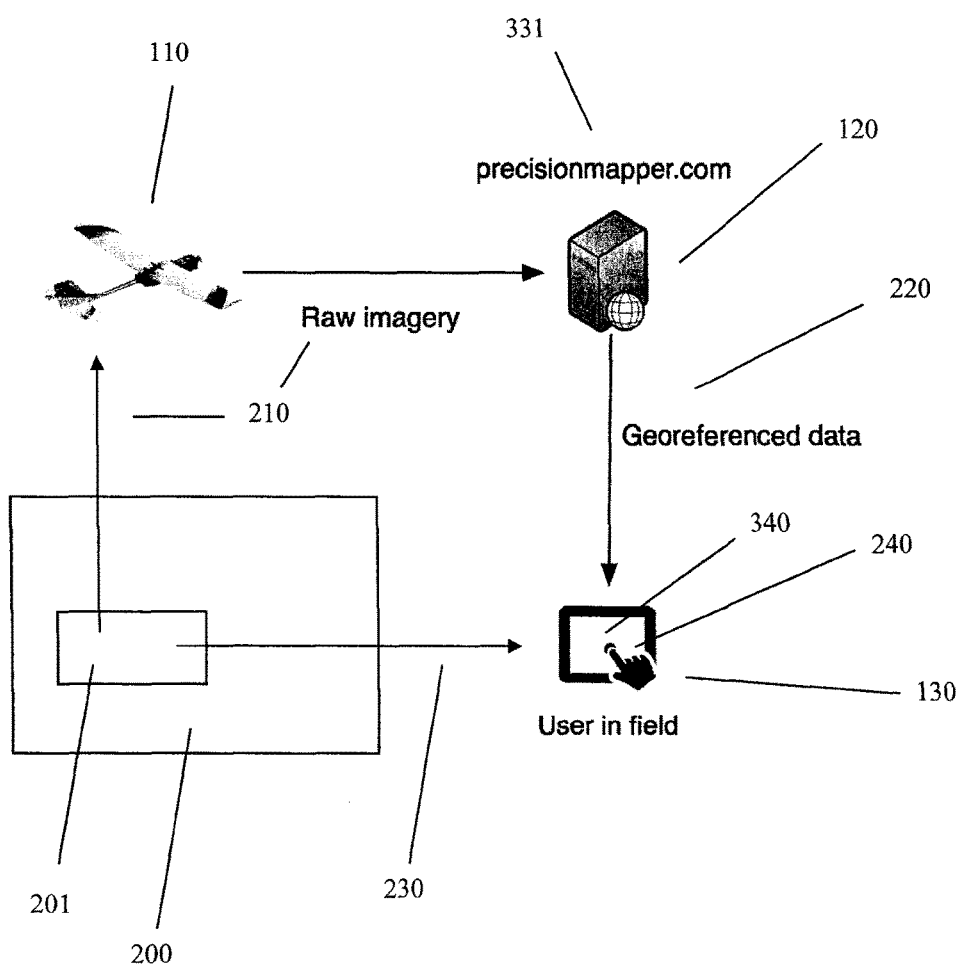
FIG. 2 is a block diagram illustrating an augmented reality system in accordance with an embodiment of the invention; and, FIG. 3 is a flow chart illustrating operations of modules within an augmented reality system for generating an augmented reality presentation of a region-of-interest, in accordance with an embodiment of the invention.

FIG. 2 is a block diagram illustrating an augmented reality system 100 in accordance with an embodiment of the invention. The system 100 includes a unmanned aerial vehicle ("UAV") 110 which may be communicatively coupled to a server 120 over a network 351. The server 120 in turn may be communicatively coupled to a wireless device 130 over a network 351. Each of the augmented reality system 100, UAV 110, server 120, and wireless device 130 may be or include a data processing system 300 or elements of such a system 300. The UAV 110 includes at least one sensor (e.g., a camera, etc.) for capturing raw image data 210 of a region-of-interest 201 in a farm field 200. The server 120 includes an application or module 331 for generating geo-referenced data 220 using the raw image data 210. The wireless device 130 includes an application or module 331 for generating an augmented reality presentation 240 for display on a display 340 of the wireless device 130 using the geo-referenced data 220 from the server 120 and real-time or live image data 230 of the region-of-interest 201 captured by at least one sensor (e.g., camera, etc.) included in the wireless device 130.

The UAV 110 collects large amounts of raw image data 210 when surveying agricultural sites (e.g., fields 200) and this data is processed into formats that are useful to users. The exact format of the output data 220 varies depending on the type of sensor that is used by the UAV 110. However, one thing that the different formats share is that the output data 220 is geo-referenced in order to correlate the captured raw image data 210 with its position in the real-world. Traditionally, this geo-referenced data 220 is overlaid on a two-dimensional map. While certainly useful, such techniques typically require the user to calculate how to arrive at a region-of-interest 201 based on looking at the top down view of the two-dimensional map. The present invention simplifies this process by overlaying geo-referenced data 220 on a live video feed 230 supplied by the camera of the user's wireless device (e.g., smartphone, tablet, etc.) 130. This allows the user positioned in the field 200 to scan the camera across the field 200 and see exactly how to navigate to a point or region-of-interest 201 such as a section 201 of the field 200 having unhealthy crops.

The wireless device 130 includes an application or module 331 which is able to display pre-processed data 220 over a real-time video feed 230. The module 331 runs on a platform 300 which has the ability to determine its GPS location and orientation in space. Modern wireless devices 130 (e.g., smartphones, etc.) may achieve this by using one or more of a GPS receiver, accelerometer, and compass. Based on the knowledge of the wireless device's location and orientation, the wireless device 130 may selectively display the data 240 which corresponds to the region-of-interest 201 present in the camera's field-of-view on the wireless device's display 340.

In operation, raw image data 210 is collected by the UAV 110 and is uploaded to the server 120 (e.g., to a website "precisionmapper.com"). That source or raw image data 210 is then processed into geo-referenced data 220 such as a normalized difference vegetation index ("NDVI") map. This geo-referenced data 220 is then transferred over the Internet 351, for example, to the wireless device 130 in the field 200. In the wireless device 130, the geo-referenced data 220 is overlaid on the live video feed 230 of the region-of-interest 201 from the wireless device's camera to produce an AR presentation 240 for display on the display 340 of the wireless device 130.

Thus, the system 100 uses a module 331 (e.g., PrecisionMapper™) at the server 120 to process and manage raw image data 210 which has been collected using a remote sensing platform such as an UAV 110. The system 100 takes geo-referenced data 220 from the PrecisionMapper™ module 331, such as a NDVI map, and overlays that data 220 on a real-time or live video feed 230 collected using a camera on the wireless device 130 which may be a smartphone, tablet, Google Glass™, etc. This allows a user such as a farmer to walk his or her field 200 and see exactly where potential problem spots 201 are and easily navigate to them by simply walking towards them as they are displayed on the display screen 340 of his or her wireless device 130. The user no longer has to use GPS coordinates which were determined ahead of time, coupled with a handheld GPS unit, to navigate himself or herself to regions-of-interest 201. Viewing an AR presentation 240 of the geo-referenced data 220 overlaid on the same view 230 that the user sees provides a more user-friendly experience and reduces the amount of time and knowledge required to make use of the raw image data 210 collected by the UAV 110.

Referring again to FIG. 2, operations of modules (e.g., software or hardware modules 331, 321) within the system 100 may include the following method steps according to one embodiment of the invention. The software or hardware modules 331, 321 may be located in the UAV 110, server 120, or wireless device 130, or may be distributed between the UAV 110, server 120, and the wireless device 130.

Step 1: The user builds a flight plan for the UAV 110 using a flight planner software module 331 associated with the UAV 110 (e.g., PrecisionHawk Flight Planner™). This allows the user to select the region-of-interest 201, altitude/ground resolution, and other parameters which affect how the mission is flown in order to collect the raw image data 210 that the user is interested in.

Step 2: The user goes to the field 200, selects the flight plan created in Step 1 from a liquid crystal display (e.g., 340) on the side of the UAV 110, launches the UAV 110, and awaits the UAV's return.

Step 3: Upon landing, the user interfaces the UAV 110 with a PrecisionMapper™ desktop software module 331 running on a data processing system 300 such as a laptop computer. This connection may be made by using a secure digital ("SD") card retrieved from the payload (e.g., camera) of the UAV 110 or by connecting the payload (e.g., camera) of the UAV 110 to the laptop 300 via an universal serial bus ("USB") cable.

Step 4: Using the PrecisionMapper™ desktop software module 331, the user verifies that sufficient raw image data 210 was captured during the flight. This may be accomplished by using an "in-field" view which uses telemetry data to project each image onto a ground plane. This may then be used to determine if sufficient image coverage and overlap was achieved.

Step 5: Once the survey quality has been verified, the module 331 uploads the survey or raw image data 210 to the PrecisionMapper™ backend storage system or server 120.

Step 6: After the survey or raw image data 210 has been uploaded to the PrecisionMapper™ backend server 120, a series of processing steps are initiated which first stitch together the aerial raw image data 210 into a geo-referenced orthomosaic 220 and then performs optional additional processing such as the creation of a NDVI map.

Step 7: Once processing is complete, the user my download and share the resulting orthomosaic images 220. These images 220 are also automatically made available in the user's Augmented Ag™ applications which run on wireless devices 130 such phones, tablets, Google Glass™, etc. For example, a NDVI map 220 generated from multispectral survey data may be overlaid on a view 230 taken from the user's point-of-view as the user walks around the field 200. The NDVI image 220 may include green areas that represent healthy plants and red areas that indicate unhealthy plants. A legend may be superimposed to help the user interpret the data. If the user has performed multiple surveys 210 of the same field 200 over time, the user may recall past surveys 210 to get a sense of what the state of the field 200 was on a previous date.

Overlaying an NDVI map is only one example. There are many algorithms which may be run against the collected data 210 and may then be presented to the user using an AR presentation 240. Water levels, nitrogen content, plan counts, and weed levels are other examples. The present invention may also be used for emergency response applications such as guiding the user to a flooded area after a survey is flown.

According to one embodiment, the raw image data 210 may be received from an UAV 110, a manned aerial vehicle (e.g., a plane, helicopter, jet, etc.), a satellite, and/or a ground vehicle (e.g., a combine, tractor, truck, etc.).

The above embodiments may contribute to an improved method and system 100 for generating AR agricultural presentations 240 and may provide one or more advantages. First, the present invention allows users to view data 220 overlaid directly on top of their view 230 of the real world 200. As the user moves around, the display is updated in real-time to show exactly what data corresponds to the geography in the camera's field-of-view. Second, as mentioned above, applications exist which augment video with geographically tagged data. For example, applications which identify the location of hotels, attractions, etc., for users as they walk down a street are available. With the present invention, the user sees data that is specific to their property. For example, a farmer may view a NDVI map which is unique to the farmer's field 200. The farmer may also view the data in time series if there are multiple dates of collection.

Aspects of the above described method may be summarized with the aid of a flowchart.

Figure 3:
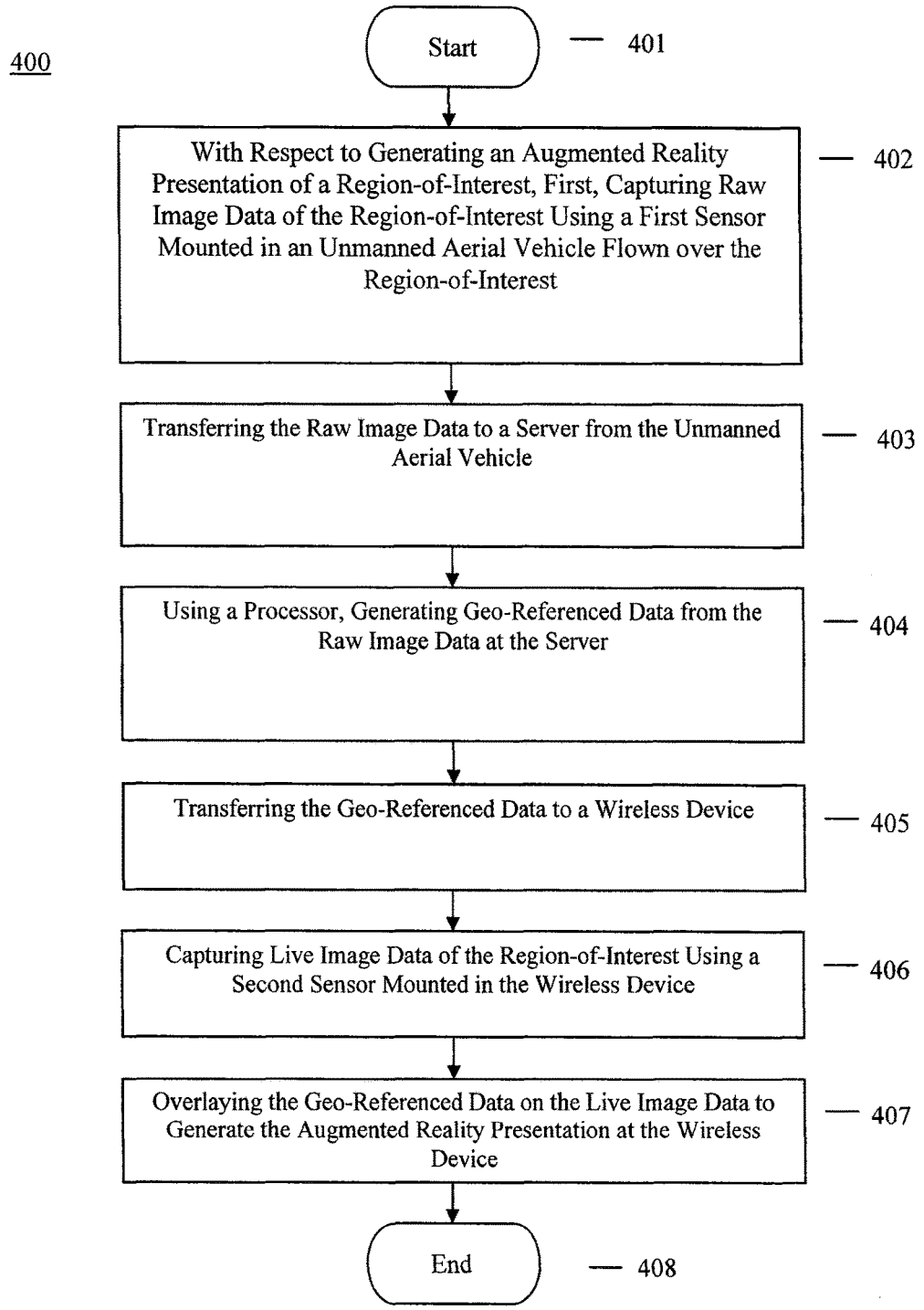

FIG. 3 is a flow chart illustrating operations 400 of modules (e.g., software or hardware modules 331, 321) within an augmented reality system (e.g., 100, 300, 110, 120, 130) for generating an augmented reality presentation 240 of a region-of-interest 201, in accordance with an embodiment of the invention.

At step 401, the operations 400 start.

At step 402, raw image data 210 of the region-of-interest 201 is captured using a first sensor mounted in an unmanned aerial vehicle 110 flown over the region-of-interest 210.

At step 403, the raw image data 210 is transferred to a server 120 from the unmanned aerial vehicle 110.

At step 404, using a processor 320, geo-referenced data 220 is generated from the raw image data 210 at the server 120.

At step 405, the geo-referenced data 220 is transferred to a wireless device 130.

At step 406, live image data 230 of the region-of-interest 201 is captured using a second sensor mounted in the wireless device 130.

At step 407, the geo-referenced data 220 is overlaid on the live image data 230 to generate the augmented reality presentation 240 at the wireless device 130.

At step 408, the operations 400 end.

The above method may further include presenting the augmented reality presentation 240 on a display 340 of the wireless device 130. The first and second sensors may be first and second cameras, respectively. And, the region-of-interest 201 may be one of a farm field 200 and located in a farm field 200.

According to one embodiment, each of the above steps 401-408 may be implemented by a respective software module 331. According to another embodiment, each of the above steps 401-408 may be implemented by a respective hardware module 321. According to another embodiment, each of the above steps 401-408 may be implemented by a combination of software 331 and hardware modules 321. For example, FIG. 3 may represent a block diagram illustrating the interconnection of specific hardware modules 401-408 (collectively 321) within a data processing system 300, each hardware module 401-408 adapted or configured to implement a respective step of the method of the invention.

While this invention is primarily discussed as a method, a person of ordinary skill in the art will understand that the apparatus discussed above with reference to a data processing system 300 may be programmed to enable the practice of the method of the invention. Moreover, an article of manufacture for use with a data processing system 300, such as a pre-recorded storage device or other similar computer readable medium or computer program product including program instructions recorded thereon, may direct the data processing system 300 to facilitate the practice of the method of the invention. It is understood that such apparatus, products, and articles of manufacture also come within the scope of the invention.

In particular, the sequences of instructions which when executed cause the method described herein to be performed by the data processing system 300 may be contained in a data carrier product according to one embodiment of the invention. This data carrier product may be loaded into and run by the data processing system 300. In addition, the sequences of instructions which when executed cause the method described herein to be performed by the data processing system 300 may be contained in a computer software product or computer program product (e.g., comprising a non-transitory medium) according to one embodiment of the invention. This computer software product or computer program product may be loaded into and run by the data processing system 300. Moreover, the sequences of instructions which when executed cause the method described herein to be performed by the data processing system 300 may be contained in an integrated circuit product (e.g., a hardware module or modules 321) which may include a coprocessor or memory according to one embodiment of the invention. This integrated circuit product may be installed in the data processing system 300.

The embodiments of the invention described above are intended to be exemplary only. Those skilled in the art will understand that various modifications of detail may be made to these embodiments, all of which come within the scope of the invention.

What is claimed is:

1. A method for generating an augmented reality presentation of a region-of-interest, comprising:
    capturing raw image data of the region-of-interest using a first sensor mounted in an unmanned aerial vehicle flown over the region-of-interest;
    transferring the raw image data to a server from the unmanned aerial vehicle;
    using a processor, generating geo-referenced data from the raw image data at the server;
    transferring the geo-referenced data to a wireless device;
    capturing live image data of the region-of-interest using a second sensor mounted in the wireless device; and,
    overlaying the geo-referenced data on the live image data to generate the augmented reality presentation at the wireless device.

2. The method of claim 1 and further comprising presenting the augmented reality presentation on a display of the wireless device.

3. The method of claim 1 wherein the first and second sensors are first and second cameras, respectively.

4. The method of claim 1 wherein the region-of-interest is one of a farm field and located in a farm field.

5. A method comprising:
    accessing, by a mobile computing device comprising a processor device, geo-referenced imagery of a region of a world, the geo-referenced imagery corresponding to specific locations of the region of the world;
    receiving, by a camera of the mobile computing device, real-time real-world imagery of a first scene of a portion of the region of the world that is within a field of view (FOV) of the camera;

determining, by the mobile computing device, a first subset of the geo-referenced imagery that corresponds to the first scene; and presenting the first subset of the geo-referenced imagery that corresponds to the first scene overlaid on top of the real-world imagery of the first scene on a display device of the mobile computing device.

6. The method of claim 5 wherein the first subset of the geo-referenced imagery comprises textual imagery that refers to specific locations within the first scene.

7. The method of claim 5 wherein the geo-referenced imagery comprises a normalized difference vegetation index ("NDVI") imagery.

8. The method of claim 5 wherein determining the first subset of the geo-referenced imagery that corresponds to the first scene further comprises:

determining an orientation and location of the FOV of the camera with respect to the world; and determining the first subset of the geo-referenced imagery that corresponds to the first scene based on the orientation and location of the FOV of the camera with respect to the world.

9. The method of claim 5 wherein the first subset of the geo-referenced imagery comprises imagery comprising colors, each different color corresponding to a health of vegetation in the first scene, and each different color overlaying a portion of the first scene having vegetation with the health that corresponds to the different color.

10. The method of claim 5 further comprising:

determining, by the mobile computing device, that the camera is receiving real-time real-world imagery of a second scene of the portion of the region of the world;

determining, by the mobile computing device, a second subset of the geo-referenced imagery that corresponds to the second scene; and presenting the second subset of the geo-referenced imagery that corresponds to the second scene overlaid on top of the real-world imagery of the second scene on the display device of the mobile computing device.

11. The method of claim 10 wherein determining, by the mobile computing device, that the camera is receiving the real-time real-world imagery of the second scene of the world further comprises determining that an orientation of the camera has moved from a first orientation to a second orientation.

12. A mobile computing device comprising:

a camera having a field of view (FOV), the camera configured to receive real-time real-world imagery of a first scene of a portion of a region of a world within the FOV of the camera;

a display device; and a processing device coupled to the camera and the display device, the processing device configured to:

access geo-referenced imagery of the region of the world, the geo-referenced imagery comprising imagery that corresponds to specific locations of the region of the world;

determine a first subset of the geo-referenced imagery that corresponds to the first scene; and present the first subset of the geo-referenced imagery that corresponds to the first scene overlaid on top of the real-time real-world imagery of the first scene on the display device.

13. The mobile computing device of claim 12 wherein the first subset of the geo-referenced imagery comprises textual imagery that refers to specific locations within the first scene.

14. The mobile computing device of claim 12, wherein to determine the first subset of the geo-referenced imagery that corresponds to the first scene, the processor device is further configured to:

determine an orientation and location of the FOV of the camera with respect to the world; and determine the first subset of the geo-referenced imagery that corresponds to the first scene based on the orientation and location of the FOV of the camera with respect to the world.

15. The mobile computing device of claim 12 wherein the first subset of the geo-referenced imagery comprises imagery comprising colors, each different color corresponding to a health of vegetation in the first scene, and each different color overlaying a portion of the first scene having vegetation with the health that corresponds to the different color.

16. The mobile computing device of claim 12 wherein the processor device is further configured to:

determine that the camera is receiving real-time real-world imagery of a second scene of the world;

determine a second subset of the geo-referenced imagery that corresponds to the second scene; and present the second subset of the geo-referenced imagery that corresponds to the second scene overlaid on top of the real-time real-world imagery of the second scene on the display device.

17. The mobile computing device of claim 16 wherein to determine that the camera is receiving the real-time real-world imagery of the second scene of the world, the processor device is further configured to determine that an orientation of the camera has moved from a first orientation to a second orientation.

18. A computer program product stored on a non-transitory computer-readable storage medium and including instructions configured to cause a processor device to:

access imagery received in real-time by a camera, the imagery comprising real-world imagery of a first scene of a portion of a region of a world within a field of view (FOV) of the camera;

access geo-referenced imagery of the region of the world, the geo-referenced imagery comprising imagery that corresponds to specific locations of the region of the world;

determine a first subset of the geo-referenced imagery that corresponds to the first scene; and present the first subset of the geo-referenced imagery that corresponds to the first scene overlaid on top of the real-world imagery of the first scene on a display device of a mobile computing device.

* * * * *